United States Patent [19]

Swars

[11] Patent Number: 4,944,173

[45] Date of Patent: Jul. 31, 1990

[54] PROBE FOR HYDRAULIC EXPANSION, INCLUDING CENTERING DEVICE

[75] Inventor: Helmut Swars, Bergisch-Gladbach, Fed. Rep. of Germany

[73] Assignee: Emitec Gesellschaft für Emissionstechnologie mbH, Lohmar, Fed. Rep. of Germany

[21] Appl. No.: 239,599

[22] Filed: Sep. 1, 1988

[30] Foreign Application Priority Data

Sep. 1, 1987 [DE] Fed. Rep. of Germany ....... 3729169

[51] Int. Cl.$^5$ .............................................. B21D 26/02
[52] U.S. Cl. ............................................. 72/62; 72/61; 29/421.1; 29/523
[58] Field of Search .................... 72/54, 60, 61, 67, 58, 72/62; 29/421.1, 523

[56] References Cited

U.S. PATENT DOCUMENTS 4,450,612  5/1984  Kelly ........................................ 72/62
4,580,426  4/1986  Zafred ...................................... 72/61

FOREIGN PATENT DOCUMENTS 92539   4/1962  Denmark ................................. 72/61
260486  7/1949  Switzerland ............................ 72/62

Primary Examiner—David Jones
Attorney, Agent, or Firm—Toren, McGeady & Associates

[57] ABSTRACT

In order to prevent a probe (2) used for expanding tubes (1) in portions from having an uneven effect due to its eccentric position in a tube which is not completely straight, the probe given a slightly flexible design is provided with centering rings (11, 13) which flexibly rest on both the inner face of the tube and on the probe member. The flexible parts (7) of seals limiting the operational regions (8), along their circumference, then evenly and simultaneously contact the inner wall of the tube. Several designs for the centering rings are possible. To facilitate their introduction into the tube, the process of introduction is accompanied by a process of lubricating the inner tube parts, a process which improves sliding and for which the hydraulic fluid required in any case may be used.

10 Claims, 1 Drawing Sheet

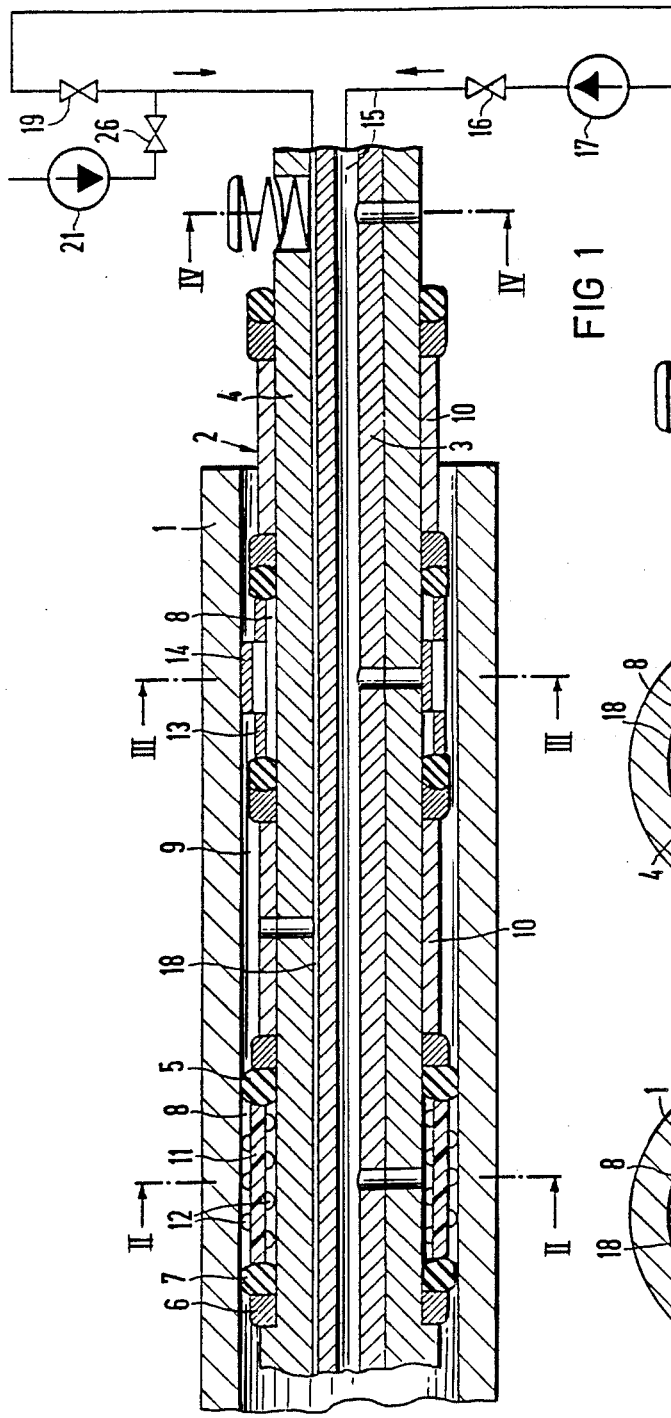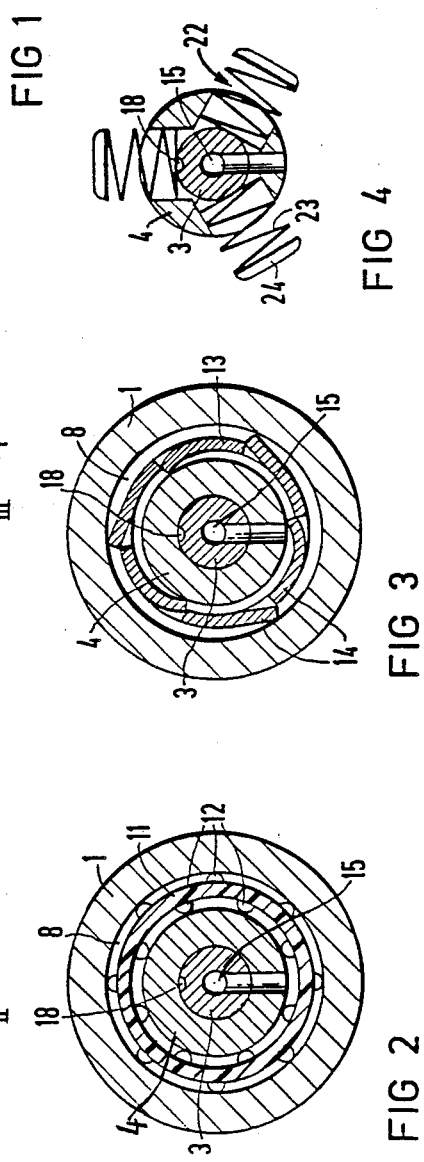

PROBE FOR HYDRAULIC EXPANSION, INCLUDING CENTERING DEVICE

The invention relates to a probe used for hydraulic expansion of tubes in portions, with seals limiting the operational regions being arranged in pairs on the surface of the probe. In EP-A-0 213 529, one of the applicants has proposed to fix a number of drive elements such as cams, gears or bearing bushes on a shaft in one operation by means of hydraulic expansion by inserting into the hollow shaft a probe comprising a corresponding number of operating regions limited by seals, which operating regions, via radial bores, are connected to a pressure fluid supply line extending inside the probe. For reasons of costs, the hollow shafts are to consist of sections of commercial precision tubes which, for production-related reasons, have slight, irregular wall thickness tolerances. Along part of its length, a probe which is inserted in such a tube and which is not necessarily completely straight would then extend eccentrically relative to the tube. Apart from the fact that it is difficult accurately to seal an expanding portion of the probe positioned in such a region by expanding the seals until they contact the inner face of the tube, it has been found that parts of the seals, as a result of the prepressure serving their expansion, are pressed into the unilaterally increased gap and squeezed, which leads to an early destruction of the seal, thereby making the probe unusable. Therefore, in their unpublished German patent application P 37 20 486.6, the applicants proposed to make the probe itself flexible to a limited extent in order to enable it to adapt to the irregularities of the inner contour of the tube to be expanded, with the temporary bending to which the probe is to be subjected being limited to just a few tenths of a millimeter.

It is the object of the invention to propose a further improvement in such a probe which is at least partially flexible by providing a centering device which ensures that the probe always extends concentrically relative to the entire length of the tube to be expanded, thereby eliminating the above-mentioned difficulties in expanding the seals.

The objective is achieved by providing centering elements between the seals, which centering elements, with their inside, flexibly rest against the probe member, and by introducing the probe into the tube may be brought into flexible contact with its inner face. In the untensioned condition the proposed centering elements project beyond the inner contour of the tube, but when introduced into the probe, thanks to suitable stop edges, they enter the tube and are compressed. The force exerted by them in the compressed condition is sufficient for bending the flexible probe in such a way that it is forced into a concentric position relative to the tube.

In a particularly suitable embodiment, the centering elements are produced from spring steel sleeves, with semi-circular slots being punched into these and with the "tabs" formed in this way being alternately bent inwardly and outwardly up to the point of permanent deformation.

An alternative embodiment of the centering elements where they are formed as annular sleeves of a flexible material napped at its surface, is particularly suitable if these are to consist of plastics, and it is irrelevant if upon application of the full pressure causing the expansion of the tube portions in question, the material of the centering ring is elastically deformed to such an extent that its centering effect is reduced: at that point in time, the seals have already reached their end position against the inner wall of the tube and centering no longer needs to be that accurate.

In further alternative embodiment, the centering elements are star-shaped flexibly arranged supports projecting from the probe contour.

To facilitate introduction of the probe into the tube, at least the spring elements coming into contact with the tube should be provided with a coating of slidable plastics such as polytetrafluor ethylene.

To facilitate introduction of the probe into the tube further, the inner wall of the tube should be moistened so that a thin lubricating film is formed so that the centering rings can slide more easily without leaving grooves on the inside of the tube. It is not necessary to use a fluid such as oil conventionally referred to as lubricant; on the contrary, the hydraulic fluid itself, e.g. water, may serve as the lubricant.

Because of the unavoidable leakage of hydraulic fluid from the expanding portions, especially prior to the seals establishing contact, special discharge means have to be provided for removing the fluid which leaked out.

In accordance with a further embodiment, in the course of introducing the probe into the tube, the purpose of the discharge means is reversed in that they are used to transport the lubricating fluid, e.g. the hydraulic fluid to the inner face of the tube.

One embodiment of the invention is illustrated in the drawing wherein

FIG. 1 shows a longitudinal section of part of the probe in accordance with the invention and the tube to be expanded along lines I—I of FIGS. 2 and 3;

FIG. 2 is a cross-section along line II—II of FIG. 1;

FIG. 3 is a further cross-section along line III—III of FIG. 1; and

FIG. 4 is a further cross-section along line IV—IV of FIG. 1.

A probe 2 consisting of a core 3 and a casing 4 soldered or glued to it is inserted into a tube 1 serving as a hollow shaft which is to be expanded in several axial portions in order to fix drive elements (e.g. cams) not illustrated on it. The material properties of the probe are such that to a limited extent it is flexible, i.e. it is capable of adapting to slight irregularities in the straightness of the tube 1. The portions of the tube 1 to be expanded correspond to operating regions 8 of the probe 2 which are each limited by continuous seals 5 each of which consists of a first non-flexible part 6 and a second part 7 made of elastomer. The center of FIG. 1 shows the seals 5 in the untensioned condition where there is a gap between the seal 5 and the inner face of the tube 1. The lefthand part of the Figure shows the condition after expansion of the flexible parts 7 as a result of which the operating region 8 positioned between them is cut off in an essentially pressure-proof way relative to the intermediate regions 9 in which regions spacer sleeves 10 ensure that there is the correct distance between the individual operating regions 8. The lefthand side of FIG. 1 and FIG. 2 illustrate a first embodiment of annular centering elements 11, e.g. made of plastics, whose inner and outer face is provided with naps 12. In the center of FIG. 1 and in FIG. 3 there is shown a second embodiment of annular centering elements 13 preferably of spring steel in the case of which "tabs" 14 are partially punched out of the sleeve member and subsequently alternately bent inwardly and outwardly. In a third embodiment illustrated in the righthand half of FIG. 1 and in FIG. 4 the centering element 22 consists of supports 24 which project in a star-like manner from the probe contour and which are uniformly tensioned and spaced apart by pressure springs 23. The flexibility of the centering elements 11, 13 and 22 which in the untensioned condition project beyond the inner diameter of the tube 1 causes them to rest flexibly on both the inner face and outer face or core of the probe 2, thereby centering the latter in the tube 1 as a result of their flexibility which is sufficient for this purpose, even of the tube 1 is not completely straight. Via a supply line 15 with radial branches arranged in the probe core 3, the operating regions 8, after opening a first valve 16 (indicated only schematically, like the subsequent parts), are supplied with a hydraulic fluid pressurised by a first pump 17. Before the flexible parts 7 of the seals 5 have come to rest against the inner face of the tube 1 under the influence of a prepressure applied to the respective operating region 8 and also as the result of later slight leakages in the seals, a small amount of hydraulic fluid invariably enters the intermediate spaces 9 from where it is discharged via discharge means 18 also provided with radial branches and, after opening a second valve 19, returned into the circuit of the hydraulic fluid. However, prior to and in the course of introducing the probe 2 into the tube 1, it is advisable to close the second valve 19 and open a third valve 26, as a result of which, with the assistance of a second pump 21, a lubricating fluid, e.e. again a hydraulic fluid, is transported in the opposite direction through the discharge means 18 into the intermediates spaces 9 where it moistens the inner face of the tube 1 so that it is easier for the naps 12 and the spring elements 14 of the centering rings 11, 13 to slide on the tube surface.

I claim:

1. A flexible probe (2) for hydraulically expanding an inner faced tube (1) in portions, comprising:
   seals (5) mounted and arranged in pairs on an outer surface of the probe, said pairs of seals defining operational regions therebetween when sealed against the inner face of the tube;
   centering elements (11, 13) mounted on the probe and arranged between the seals of each said pair of seals, said centering elements flexibly resting against the outer surface of the probe (2) and flexibly contactable with the inner face of the tube when the probe is introduced into the tube, the centering elements being comprised of annular sleeves circumscribing the probe and having circumferentially distributed spring elements projecting therefrom and alternately bent inwardly toward the probe and outwardly toward a tube to be bent; and
   means for providing a pressurized hydraulic fluid to said operational regions so that the portions of the tube are expanded.

2. A probe according to claim 1, wherein the spring elements are provided with a coating of slidable plastic material.

3. A probe according to claim 1, and further comprising means on the probe for moistening the inner face of the tube with a lubricating fluid.

4. A probe according to claim 3, wherein the lubricating fluid is an hydraulic fluid.

5. A probe according to claim 3, wherein the means for moistening the inner face of the tube also acts as means for discharging any hydraulic fluid leakages occurring during operation.

6. A probe according to claim 3, wherein the means for moistening the inner face of the tube also acts as means for discharging any hydraulic fluid leakages occurring during operation.

7. A flexible probe (2) for hydraulically expanding an inner faced tube (1) in portions, comprising:
   seals (5) mounted and arranged in pairs on an outer surface of the probe, said pairs of seals defining operational regions therebetween when sealed against the inner face of the tube;
   centering elements (11, 13) mounted on the probe and arranged between the seals of each said pair of seals, said centering elements flexibly resting against the outer surface of the probe (2) and flexibly contactable with the inner face of the tube when the probe is introduced into the tube, the centering elements being comprised of a plurality of supports which each project radially outwardly from the probe in a star-like manner under pressure of spring means; and
   means for providing a pressurized hydraulic fluid to said operational regions so that the portions of the tube are expanded.

8. A probe according to claim 7, wherein the supports are provided with a coating of slidable plastic material.

9. A probe according to claim 7, and further comprising means on the probe for moistening the inner face of the tube with a lubricating fluid.

10. A probe according to claim 9, wherein the lubricating fluid is an hydraulic fluid.

* * * * *